(12) United States Patent
Lian

(10) Patent No.: US 12,343,633 B2
(45) Date of Patent: Jul. 1, 2025

(54) OPERATION PROMPTING METHOD AND APPARATUS, TERMINAL, AND STORAGE MEDIUM

(71) Applicant: Tencent Technology (Shenzhen) Company Limited, Shenzhen (CN)

(72) Inventor: Jianfeng Lian, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 430 days.

(21) Appl. No.: 17/986,716

(22) Filed: Nov. 14, 2022

(65) Prior Publication Data

US 2023/0070612 A1 Mar. 9, 2023

Related U.S. Application Data

(63) Continuation of application No. PCT/CN2021/118239, filed on Sep. 14, 2021.

(30) Foreign Application Priority Data

Sep. 29, 2020 (CN) .......................... 202011057681.7

(51) Int. Cl.
*A63F 13/52* (2014.01)
*A63F 13/219* (2014.01)
(Continued)

(52) U.S. Cl.
CPC .......... *A63F 13/577* (2014.09); *A63F 13/219* (2014.09); *A63F 13/52* (2014.09);
(Continued)

(58) Field of Classification Search
CPC .............. A63F 13/577; A63F 13/21952; A63F 13/837; A63F 13/537
See application file for complete search history.

(56) References Cited

U.S. PATENT DOCUMENTS 8,939,366 B1 * 1/2015 Kelly ...................... F41G 3/165
 235/404
9,480,921 B2 * 11/2016 Yudo ...................... A63F 13/577
(Continued)

FOREIGN PATENT DOCUMENTS

CN 107029425 A 8/2017
CN 108404407 A 8/2018
(Continued)

OTHER PUBLICATIONS

Tencent Technology, ISR, PCT/CN2021/118239, Dec. 16, 2021, 2 pgs.

(Continued)

*Primary Examiner* — James S. McClellan
(74) *Attorney, Agent, or Firm* — Morgan, Lewis & Bockius LLP

(57) ABSTRACT

An operation prompting method includes: in accordance with a determination that an aiming point is located in an area of a body of a target virtual object: determine a first distance that moves the aiming point out of the area of the body of the target virtual object; determining a second distance of an expected movement distance of the target virtual object relative to the aiming point in an attack preparation duration; and performing an attack prompt when the first distance is greater than the second distance, which indicates that the aiming point does not move out of the area of the body of the target virtual object within the attack preparation duration, and a user can perform an attack operation in time so that the attack operation hits the virtual object. Therefore, the terminal performs the attack prompt to prompt the user to perform the attack operation.

20 Claims, 8 Drawing Sheets

(51) Int. Cl.
*A63F 13/577* (2014.01)
*A63F 13/837* (2014.01)
*G06T 7/20* (2017.01)
*G06T 7/70* (2017.01)
*G06V 10/74* (2022.01)

(52) U.S. Cl.
CPC .............. *A63F 13/837* (2014.09); *G06T 7/20* (2013.01); *G06T 7/70* (2017.01); *G06V 10/761* (2022.01)

(56) References Cited

U.S. PATENT DOCUMENTS

| | | | | |
|---|---|---|---|---|
| 2009/0011808 | A1* | 1/2009 | Ikematsu | A63F 13/426 |
| | | | | 463/2 |
| 2010/0009733 | A1* | 1/2010 | Garvin | A63F 13/10 |
| | | | | 463/37 |
| 2012/0004017 | A1* | 1/2012 | Sakurai | A63F 13/5258 |
| | | | | 463/2 |
| 2013/0288790 | A1* | 10/2013 | Wang | A63F 13/2145 |
| | | | | 463/31 |
| 2015/0241172 | A1* | 8/2015 | Roman | F41G 1/473 |
| | | | | 235/404 |
| 2017/0235462 | A1 | 8/2017 | Zhou | |
| 2019/0091561 | A1* | 3/2019 | Li | G06F 3/04842 |
| 2020/0285370 | A1 | 9/2020 | Hao et al. | |

FOREIGN PATENT DOCUMENTS

| | | |
|---|---|---|
| CN | 108635858 A | 10/2018 |
| CN | 109701280 A | 5/2019 |
| CN | 109821238 A | 5/2019 |
| CN | 110170168 A | 8/2019 |
| CN | 110448891 A | 11/2019 |
| CN | 111672118 A | 9/2020 |
| CN | 112121438 A | 12/2020 |
| WO | WO 2019154255 A1 | 8/2019 |

OTHER PUBLICATIONS

Tencent Technology, WO, PCT/CN2021/118239, Dec. 16, 2021, 4 pgs.
Tencent Technology, IPRP, PCT/CN2021/118239, Mar. 28, 2023, 5 pgs.
Tencent Technology, Korean Office Action, KR Patent Application No. 10-2022-7044215, Aug. 19, 2024, 5 pgs.

* cited by examiner

OPERATION PROMPTING METHOD AND APPARATUS, TERMINAL, AND STORAGE MEDIUM

CROSS-REFERENCE TO RELATED APPLICATIONS

This application is a continuation application of PCT Patent Application No. PCT/CN2021/118239, entitled "OPERATION PROMPT METHOD AND DEVICE, TERMINAL AND STORAGE MEDIUM" filed on Sep. 14, 2021, which claims priority to Chinese Patent Application No. 202011057681.7, filed with the State Intellectual Property Office of the People's Republic of China on Sep. 29, 2020, and entitled "OPERATION PROMPTING METHOD AND APPARATUS, TERMINAL, AND STORAGE MEDIUM", all of which are incorporated herein by reference in their entirety.

FIELD OF THE TECHNOLOGY

Embodiments of this application relate to the field of computer technologies, and in particular, to an operation prompting method and apparatus, a terminal, and a storage medium.

BACKGROUND OF THE DISCLOSURE

In a video game, an aiming position is usually represented by displaying an aiming point. For example, when a virtual object A intends to use a virtual firearm to shoot a virtual object B, the virtual object A controls the virtual firearm to point to the virtual object B so that the aiming point is located in an area of a body of the virtual object B, and then performs a shooting operation to hit the virtual object B.

SUMMARY

Embodiments of this application provide an operation prompting method and apparatus, a terminal, and a storage medium, which can improve the hit rate of an attack operation. The technical solutions are as follows:

according to an aspect, an operation prompting method is provided, and is performed by a terminal. The method includes:
  in accordance with a determination that an aiming point is located in an area of a body of a target virtual object:
    determining a first distance for moving the aiming point out of the area of the body of the target virtual object;
    determining a second distance, the second distance being an expected movement distance of the target virtual object relative to the aiming point within an attack preparation duration; and
  in accordance with a determination that the first distance is greater than the second distance: performing an attack prompt.

According to another aspect, an operation prompting apparatus is provided, and includes:
  a first distance determining module, configured to determine, in a case that an aiming point is located in an area of a body of a target virtual object, a first distance required for the aiming point to move out of the area of the body of the target virtual object;
  a second distance determining module, configured to determine a second distance, the second distance being an expected movement distance of the target virtual object relative to the aiming point in an attack preparation duration; and
  an attack prompt module, configured to perform an attack prompt in accordance with a determination that the first distance is greater than the second distance.

In some embodiments, the attack prompt module includes:
  a highlighting unit, configured to highlight the aiming point in a case that the first distance is greater than the second distance.

In some embodiments, the highlighting unit is configured to perform at least one of the following:
  enlarging a size of the aiming point;
  increasing a brightness of the aiming point;
  switching the aiming point from a static display to a dynamic display; or
  displaying a special effect corresponding to the aiming point.

In some embodiments, the attack prompt module includes:
  a prompt information display unit, configured to display attack operation prompt information in accordance with a determination that the first distance is greater than the second distance.

In some embodiments, the first distance determining module includes:
  an edge point determining unit, configured to determine a target edge point of the area of the body of the target virtual object in accordance with a determination that the aiming point is located in the area of the body of the target virtual object; and
  a first distance determining unit, configured to determine the first distance between the aiming point and the target edge point.

In some embodiments, the edge point determining unit is configured to:
  determine a movement direction of the aiming point relative to the target virtual object; and
  determine a ray having the aiming point as a starting point and extending along the movement direction, and determine an intersection of the ray and a boundary line of the area of the body of the target virtual object as the target edge point.

In some embodiments, the edge point determining unit is configured to:
  determine an edge point farthest from the aiming point in the area of the body of the target virtual object as the target edge point.

In some embodiments, the edge point determining unit is configured to:
  determine a straight line passing through the aiming point and extending along a horizontal direction, and determine two intersections of the straight line and a boundary line of the area of the body of the target virtual object; and
  determine an intersection farthest from the aiming point in the two intersections as the target edge point.

In some embodiments, the second distance determining module includes:
  a movement speed determining unit, configured to determine a target movement speed of the target virtual object relative to the aiming point; and
  a second distance determining unit, configured to determine the second distance according to the target movement speed and the attack preparation duration.

In some embodiments, the movement speed determining unit is configured to:
  obtain a first movement speed and a first movement direction of the target virtual object in a virtual scene interface;
  obtain a second movement speed and a second movement direction of the aiming point in the virtual scene interface; and
  determine the target movement speed according to the first movement speed, the first movement direction, the second movement speed, and the second movement direction.

In some embodiments, the movement speed determining unit is configured to:
  determine a movement speed of the target virtual object in a virtual scene interface as the target movement speed in accordance with a determination that the aiming point is in a static state.

In some embodiments, the apparatus further includes:
  a third distance determining module, configured to determine a third distance, the third distance being a movement distance of the target virtual object in a time period in which the aiming point is located in the area of the body of the target virtual object; and
  the attack prompt module is further configured to cancel the attack prompt in accordance with a determination that the third distance is greater than a difference between the first distance and the second distance.

In some embodiments, the third distance determining module includes:
  a first position obtaining unit, configured to obtain a first position where the target virtual object is located in accordance with a determination that the aiming point moves into the area of the body of the target virtual object;
  a second position obtaining unit, configured to obtain a second position where the target virtual object is currently located; and
  a third distance determining unit, configured to determine the third distance located between the first position and the second position.

In some embodiments, the first distance determining unit is configured to:
  determine the first distance in accordance with a determination that the aiming point is located in the area of the body of the target virtual object and the target virtual object is in a moving state.

In some embodiments, the attack prompt module is further configured to:
  perform the attack prompt in accordance with a determination that the aiming point is located in the area of the body of the target virtual object and the target virtual object is in a static state.

In some embodiments, the apparatus further includes:
  an attack module, configured to control, in response to an attack operation, a controlled virtual object to attack a position where the aiming point is located.

In some embodiments, the attack module includes:
  a shooting unit, configured to control, in response to a shooting operation, the controlled virtual object to use a virtual firearm to shoot the position where the aiming point is located; or
  a skill casting unit, configured to control, in response to a skill casting operation, the controlled virtual object to cast a skill to the position where the aiming point is located.

According to another aspect, a terminal is provided, including a processor and a memory, the memory storing at least one piece of program code, the at least one piece of program code being loaded and executed by the processor to implement the operations performed in the operation prompting method according to the above aspect.

According to another aspect, a computer-readable storage medium is provided, storing at least one piece of program code, the at least one piece of program code being loaded and executed by a processor to implement the operations performed in the operation prompting method according to the above aspect.

According to another aspect, a computer program product or a computer program is provided, the computer program product or the computer program including computer program code, the computer program code being stored in a computer-readable storage medium, a processor of a terminal reading the computer program code from the computer-readable storage medium, and the processor executing the computer program code to cause the terminal to implement the operations performed in the operation prompting method according to the above aspect.

According to the method, the apparatus, the terminal, and the storage medium provided in the embodiments of this application, if a distance required for an aiming point to move out of an area of a body of a virtual object is greater than a distance of the virtual object relative to the aiming point in an attack preparation duration, it indicates that the aiming point does not move out of the area of the body of the target virtual object in the attack preparation duration, and a user can hit the virtual object when performing an attack operation. Therefore, an attack prompt is performed, to prompt the user to perform the attack operation, so that the user can better grasp the timing of the attack, and the hit rate of the attack operation is improved.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from the accompanying drawings without creative efforts.

DESCRIPTION OF EMBODIMENTS

Figure 1:
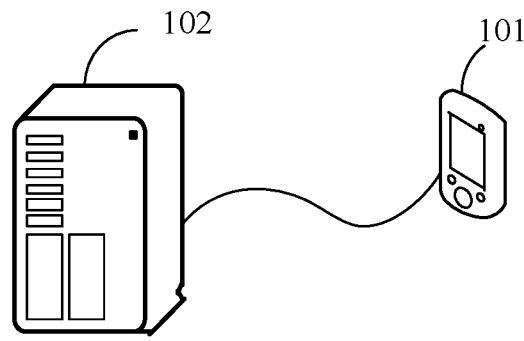
FIG. 1 is a schematic diagram of an implementation environment according to an embodiment of this application.

To make objectives, technical solutions, and advantages of the embodiments of this application clearer, the following further describes in detail implementations of this application with reference to the accompanying drawings.

It may be understood that, the terms "first", "second", and the like used in this application may be used for describing various concepts in this specification. However, the concepts are not limited by the terms unless otherwise specified. The terms are merely used for distinguishing one concept from another concept. For example, without departing from the scope of this application, a first distance may be referred to as a second distance, and similarly, the second distance may be referred to as the first distance.

A virtual scene involved in this application is used for simulating a three-dimensional virtual space. The three-dimensional virtual space may be an open space. The virtual scene is used for simulating a real environment in reality. For example, the virtual scene may include the sky, the land, the ocean, and the like. The land may include environmental elements such as the desert and a city. Certainly, the virtual scene further includes virtual items, such as a missile, a building, a vehicle, and a weapon required for a virtual object in the virtual scene to arm the virtual object or fight against other virtual objects. The virtual scene is further used for simulating a real environment under a different weather, for example, a sunny day, a rainy day, a foggy day, or a dark night. Various scene elements enhance the variety and authenticity of the virtual scene.

A user controls the virtual object to move in the virtual scene, the virtual object is a virtual figure used for representing the user in the virtual scene, and the virtual figure is in any form, such as a person or an animal. This is not limited in this application. By using a video game as an example, the video game is a video game that uses hot weapons for long-range attack, such as a first-person shooter game and a third-person shooter game. By using a shooting game as an example, in the virtual scene, the user can control the virtual object to fall freely, glide, or fall after a parachute is opened in the sky; or to run, jump, creep, stoop and move forward in the land; or control the virtual object to swim, float, or dive in the ocean. Certainly, the user can also control the virtual object to ride in a vehicle to move in the virtual scene. The user can also control the virtual object to get in and out of a building in the virtual scene, discover and pick up a virtual item (such as, a missile or a weapon) in the virtual scene, and use the picked virtual item to fight against another virtual object. For example, the virtual item is clothing, a helmet, a bulletproof vest, a medical product, a cold weapon, or a hot weapon, or is a virtual item left after another virtual object is eliminated. Herein, the foregoing scenario is merely used as an example for description, which is not specifically limited in the embodiments of this application.

In the embodiments of this application, by using the video game scene as an example, a user performs an operation on a terminal in advance. After detecting the operation of the user, the terminal downloads a game configuration file of the video game. The game configuration file includes an application program, interface display data, virtual scene data, or the like of the video game, so that the user invokes the game configuration file while logging in to the video game on the terminal, to render and display an interface of the video game. The user performs a touch operation on the terminal. After detecting the touch operation, the terminal determines game data corresponding to the touch operation and render and display the game data. The game data includes virtual scene data, behavioral data of a virtual object in the virtual scene, and the like.

When rendering and displaying the foregoing virtual scene, the terminal displays the virtual scene in full screen. Alternatively, the terminal independently displays a global map in a first preset area on a current display interface when displaying the virtual scene on the current display interface. Alternatively, the terminal displays the global map only when detecting a click operation on a preset button. The global map is used for displaying a thumbnail of the virtual scene, and the thumbnail is used for describing corresponding geographic characteristics of the virtual scene, for example, topography, landform, and geographic positions. Certainly, the terminal may further display thumbnails of virtual scenes within a specific distance around the current virtual object on the current display interface. When detecting a click operation on the global map, the terminal displays a thumbnail of the overall virtual scene in a second preset area of the current display interface, so that the user can view not only the virtual scenes around the user, but also the overall virtual scene. When detecting a zooming operation on the full thumbnail, the terminal zooms and displays the full thumbnail. In some embodiments, specific display positions and shapes of the first preset area and the second preset area are set according to users' operation habits. For example, to prevent the virtual scene from being excessively blocked, the first preset area is a rectangular area in the upper right corner, the lower right corner, the upper left corner, or the lower left corner of the current display interface. The second preset area is a square area on the right or left side of the current display interface. Alternatively, the first preset area and the second preset area are circular areas or areas of other shapes. Specific display positions and shapes of the preset areas are not limited in the embodiments of this application.

FIG. 1 is a schematic diagram of an implementation environment according to an embodiment of this application. As shown in FIG. 1, the implementation environment includes a terminal 101 and a server 102.

In some embodiments, the terminal 101 is a smartphone, a tablet computer, a notebook computer, a desktop computer, a smart speaker, an intelligent television, a smartwatch, or the like, but is not limited thereto. In some embodiments, the server 102 may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal 101 and the server 102 are directly or indirectly connected in a wired or wireless communication manner. This is not limited in this application.

The server 102 provides the terminal 101 with a virtual scene. Through the virtual scene provided by the server 102, the terminal 101 can display a virtual scene interface and display a virtual object in the virtual scene interface. The terminal 101 can control the virtual scene based on the virtual scene interface. The server 102 is configured to perform background processing according to the control of the terminal 101 on the virtual scene, to provide background support for the terminal 101.

In some embodiments, a game application is installed on the terminal 101. The game application is an application provided by the server 102, or an application in an operating system of the terminal 101, or an application provided by a third party. The terminal 101 interacts with the server 102 by using the game application.

An operation prompting method provided in the embodiments of this application is applicable to the video game scene.

For example, a scene in which a virtual object uses a virtual firearm to shoot.

When a user intends to control a virtual object A to use a virtual firearm to shoot a virtual object B, the virtual firearm is pointed to the virtual object B, so that an aiming point is located in an area of a body of the virtual object B. However, a certain attack preparation duration is required from the aiming point being located in the area of body of the virtual object B to the user pressing a shooting button. In this case, the virtual object B may have moved, so that the aiming point is no longer in the area of body of the virtual object B.

Therefore, by using the method provided in the embodiments of this application, when the aiming point is located in the area of the body of the virtual object B, a first distance required for the aiming point to move out of the area of the body of the virtual object B is determined, and a second distance that the virtual object B can move in the attack preparation duration. If the first distance is greater than the second distance, the aiming point does not move out of the area of the body of the virtual object B in the attack preparation duration, and in this case, the virtual object B can be hit when a shooting operation is performed. Therefore, the aiming point is highlighted, to prompt the user to perform an attack operation.

Figure 2:
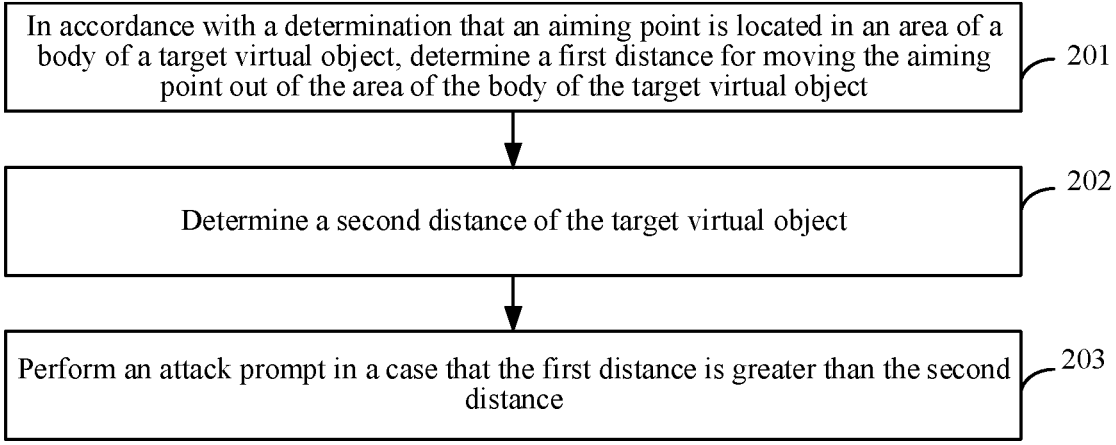
FIG. 2 is a flowchart of an operation prompting method according to an embodiment of this application.

FIG. 2 is a flowchart of an operation prompting method according to an embodiment of this application. An execution entity of this embodiment of this application is a terminal. Referring to FIG. 2, the method includes the following steps:

201. Determine, in accordance with a determination that an aiming point is located in an area of a body of target virtual object, a first distance required for the aiming point to move out of the area of the body of the target virtual object.

The virtual scene includes a plurality of virtual objects that battle, and the terminal displays a virtual scene interface, where the virtual scene interface includes a virtual scene within a viewing angle range of a controlled virtual object. The controlled virtual object is a virtual object corresponding to a user identifier logged-in on the terminal. The terminal controls the controlled virtual object according to an operation performed by a user. The virtual scene interface further displays the aiming point, and the aiming point is used for aiming at a position in the virtual scene. For example, when the controlled virtual object holds a firearm, the aiming point is a position where a bullet of the virtual firearm shoots. In another example, when the controlled virtual object casts a skill, the aiming point is a position where the skill of the virtual object is casted to.

In some embodiments, the user adjusts the position where the aiming point aims at by performing an operation on the terminal. For example, the user changes the viewing angle range by controlling the controlled virtual object to move, so as to adjust the position where the aiming point aims at. In another example, when the controlled virtual object holds a virtual firearm and the controlled virtual object turns on a scope of the virtual firearm, the aiming point displayed in the virtual scene interface in this case is an aiming point in the scope, the aiming point moves according to a movement condition of the virtual firearm, and the user controls the position where the aiming point aims at by controlling the movement of the virtual firearm.

In this embodiment of this application, when the user intends to control the controlled virtual object to attack the target virtual object, the user controls the aiming point in the virtual scene interface to aim at the target virtual object, that is, controls the aiming point to be located in the area of body of the target virtual object (hereinafter "body area"). Therefore, in accordance with a determination that the aiming point is located in the body area of the target virtual object, the terminal determines the first distance required for the aiming point to move out of the body area of the target virtual object.

202. Determine a second distance of the target virtual object.

The second distance is an expected movement distance of the target virtual object relative to the aiming point in an attack preparation duration. Moreover, the second distance is not a distance that the target virtual object has moved, but a distance that the target virtual object can move relative to the aiming point in the attack preparation duration.

The attack preparation duration is a preset duration, which can represent a duration from a time point at which the aiming point is first located in the body area of the target virtual object to a time point at which the controlled virtual object performs an attack operation. In some embodiments, the attack preparation duration includes a duration from the time point at which the aiming point is first located in the body area to a time point at which the user of the terminal determines that the aiming point has been located in the body area, and the attack preparation duration further includes a duration from the time point at which the user determines that the aiming point has been located in the body area to the time point the user actually performs the attack operation. In some embodiments, the attack preparation duration is set by the terminal by default.

The target virtual object in the virtual scene interface can move, and the aiming point in the virtual scene interface can also move. Therefore, both the movement of the target virtual object and the movement of the aiming point may cause the aiming point to move out of the body area of the target virtual object. Therefore, the second distance is the expected movement distance of the target virtual object relative to the aiming point.

203. Perform an attack prompt in accordance with a determination that the first distance is greater than the second distance.

In this embodiment of this application, in accordance with a determination that the aiming point is located in the body area of the target virtual object, the performed attack operation in this case is an operation of attacking the position where the aiming point aims at, that is, the attack operation is performed in this case, and the attack operation hits the target virtual object, so that the target virtual object is attacked. However, because there is the attack preparation duration and the target virtual object may move in the attack preparation duration, the position where the aiming point aims at has changed when the attack operation is performed, for example, the aiming point has moved out of the body area of the target virtual object.

If the first distance is greater than the second distance, it indicates that even though the target virtual object moves the second distance relative to the aiming point in the attack preparation duration, the aiming point does not move out of the body area of the target virtual object, that is, when the user performs the attack operation, the attack operation can hit the target virtual object. Therefore, in accordance with a determination that the first distance is greater than the second distance, the terminal performs the attack prompt, to prompt the user to perform the attack operation.

According to the method provided in the embodiments of this application, if a distance required for an aiming point to move out of a body area of a virtual object is greater than a distance of the virtual object relative to the aiming point in an attack preparation duration, it indicates that the aiming point does not move out of the body area in the attack preparation duration, and a user can hit the virtual object when performing an attack operation. Therefore, an attack prompt is performed, to prompt the user to perform the attack operation, so that the user can better grasp the timing of the attack, and the hit rate of the attack operation is improved.

Figure 3:
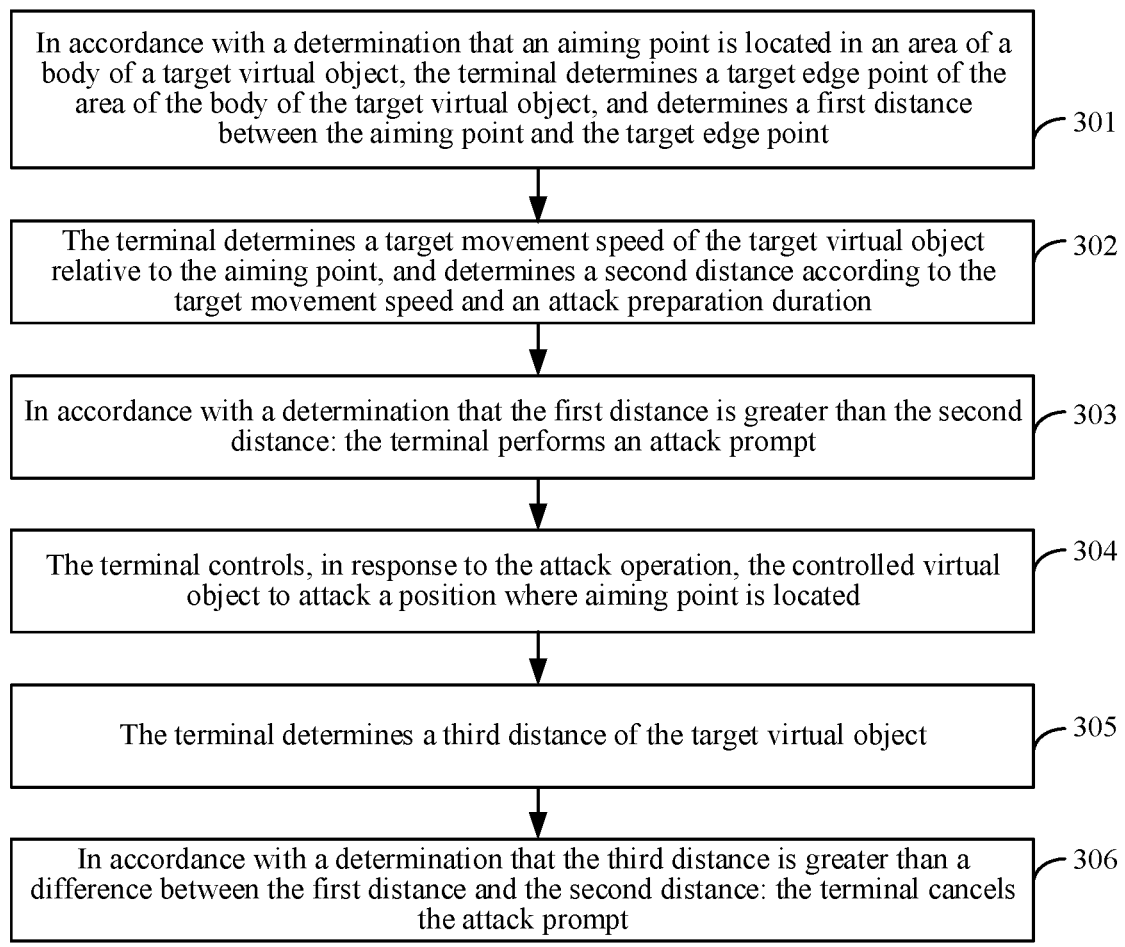
FIG. 3 is a flowchart of another operation prompting method according to an embodiment of this application.

FIG. 3 is a flowchart of an operation prompting method according to an embodiment of this application. An execution entity of this embodiment of this application is a terminal. Referring to FIG. 3, the method includes the following steps:

301. In accordance with a determination that an aiming point is located in a body area of a target virtual object, the terminal determines a target edge point of the body area, and determines a first distance between the aiming point and the target edge point.

A virtual scene includes a plurality of virtual objects that battle, and the terminal displays a virtual scene interface, where the virtual scene interface includes a virtual scene within a viewing angle range of a controlled virtual object. The controlled virtual object is a virtual object corresponding to a user identifier logged-in on the terminal. The virtual scene interface further displays the aiming point, and the aiming point is used for aiming at a position in the virtual scene. For example, the aiming point is a sight bead displayed in the virtual scene interface. Alternatively, the aiming point is an aiming point in a scope configured in a virtual firearm.

In this embodiment of this application, when the user intends to control the controlled virtual object to attack the target virtual object, the user controls the aiming point in the virtual scene interface to aim at the target virtual object, that is, controls the aiming point to be located in the body area of the target virtual object. Therefore, in accordance with a determination that the aiming point is located in the body area of the target virtual object, the terminal determines the target edge point of the body area of the target virtual object, and a distance between the target edge point and the aiming point is the first distance required for the aiming point to move out of the body area. The target virtual object is any virtual object in the plurality of virtual objects in the virtual scene, for example, the target virtual object is a virtual object currently displayed in the virtual scene interface.

In a possible implementation, to facilitate obtaining the target edge point of the body area, the terminal sets the body area of the target virtual object as a rectangular area. Alternatively, the terminal sets the body area of the target virtual object as an area formed by a rectangular area and a circular area, where a torso and limbs of the target virtual object are represented by the rectangular area, and a head of the target virtual object is represented by the circular area. Alternatively, to improve the processing precision, the terminal sets the body area of the target virtual object as an area corresponding to a contour of the target virtual object.

In a possible implementation, the terminal determines a movement direction of the aiming point relative to the target virtual object, determines a ray having the aiming point as a starting point and extending along the movement direction, and determines an intersection of the ray and a boundary line of the body area as the target edge point.

In accordance with a determination that the movement direction of the aiming point relative to the target virtual object is a direction in which the aiming point moves out of the body area of the target virtual object, the terminal determines the ray with the aiming point as the starting point and extending along the movement direction, and the ray may be regarded as a movement trajectory of which the aiming point moves out of the body area of the target virtual object. Therefore, the intersection of the ray and the boundary line of the body area is a last point passing through the body area in a process in which the aiming point moves out of the body area, and a distance between the intersection and the aiming point is the first distance required for the aiming point to move out of the body area. Therefore, the terminal determines the intersection as the target edge point.

In some embodiments, in accordance with a determination that the aiming point is in a static state in the virtual scene interface, the movement direction of the aiming point relative to the target virtual object is a direction opposite to a movement direction of the target virtual object.

In some embodiments, in accordance with a determination that both the aiming point and the target virtual object are in a moving state in the virtual scene interface, the terminal determines the movement direction of the aiming point relative to the target virtual object according to a first movement speed and a first movement direction of the target virtual object in the virtual scene interface and a second movement speed and a second movement direction of the aiming point in the virtual scene interface.

For example, the terminal determines a first vector corresponding to the target virtual object according to the first movement speed and the first movement direction, and the first vector can represent the movement speed and the movement direction of the target virtual object. The terminal determines a second vector corresponding to the aiming point according to the second movement speed and the second movement direction, and the second vector can represent the movement speed and the movement direction of the aiming point. The terminal determines a vector difference between the first vector and the second vector, and a direction indicated by the vector difference is the movement direction of the aiming point relative to the target virtual object.

Figure 4:
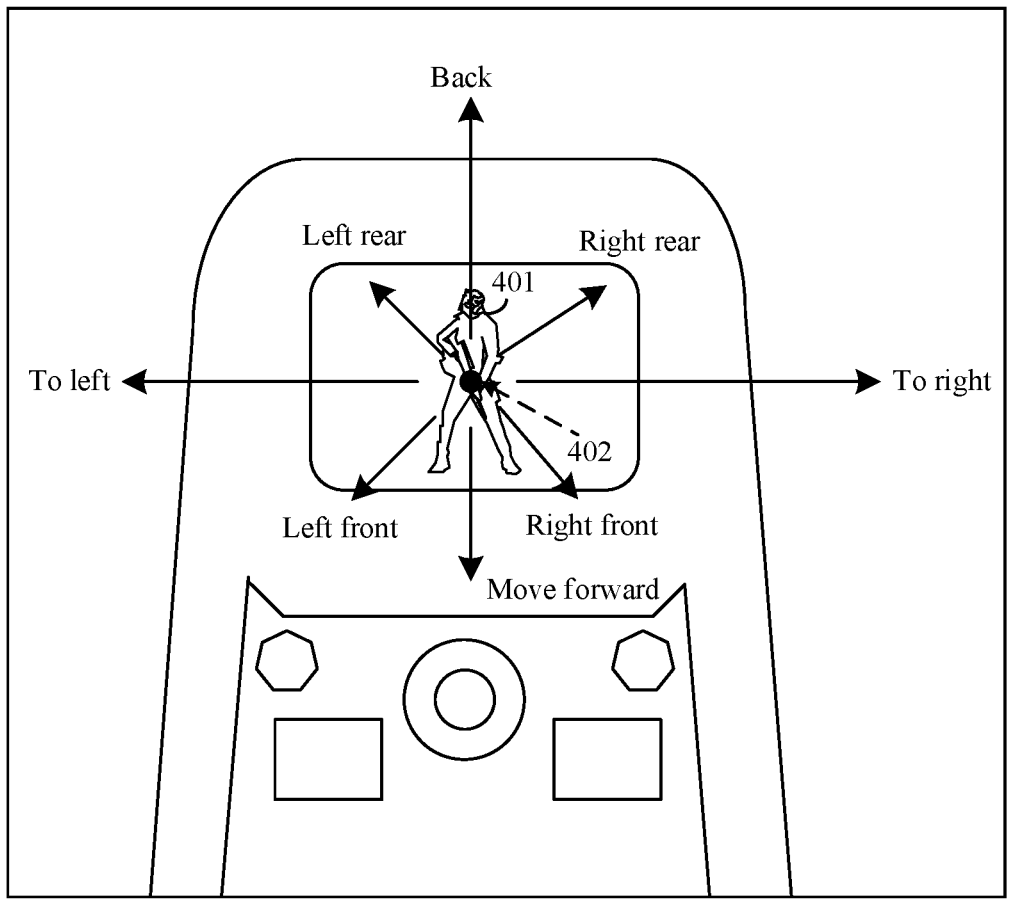
FIG. 4 is a schematic diagram of a movement direction according to an embodiment of this application.

FIG. 4 is a schematic diagram of a movement direction according to an embodiment of this application. Referring to FIG. 4, a target virtual object 401 and an aiming point 402 in a scope are displayed in a virtual scene interface. If the aiming point 402 is in a static state, when the target virtual object 401 moves to the left, the aiming point 402 moves to the right relative to the target virtual object 401; when the target virtual object 401 moves to the right rear, the aiming point 402 moves to the left front relative to the target virtual object 401; and when the target virtual object 401 retreats and that the target virtual object 401 moves upward is displayed in the virtual scene interface, the aiming point 402 moves downward relative to the target virtual object 401.

Figure 5:
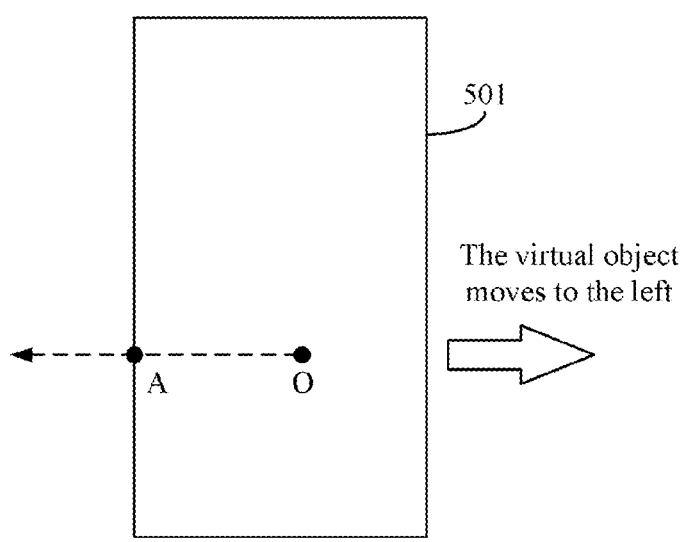
FIG. 5 is a schematic diagram of a first distance according to an embodiment of this application.

FIG. 5 is a schematic diagram of a first distance according to an embodiment of this application. Referring to FIG. 5, an aiming point 0 is located in a body area 501 of a virtual object, and if the virtual object moves horizontally to the right, the aiming point 0 moves horizontally to the left relative to the virtual object. If a ray having the aiming point 0 as a starting point and extending along the horizontal-to-left direction is determined, and an intersection of the ray and a boundary line of the body area 501 is an edge point A, a distance between the aiming point 0 and the edge point A is a distance required for the aiming point 0 to move out of the body area 501.

In another possible implementation, the terminal determines an edge point farthest from the aiming point in the body area as the target edge point. The distance required for the aiming point to move out of the body area of the target virtual object is a longest distance in distances between the aiming point and a plurality of edge points in the body area. Therefore, the edge point farthest from the aiming point is determined as the target edge point, so that a distance between the target edge point and the aiming point is determined as the first distance required for the aiming point to move out of the body area.

In another possible implementation, the terminal determines a straight line passing through the aiming point and extending along a horizontal direction, determines two intersections of the straight line and a boundary line of the body area, and determines an intersection farthest from the aiming point in the two intersections as the target edge point.

Considering that a possibility that the movement direction of the aiming point relative to the target virtual object in the virtual scene interface is the horizontal direction is greater than a possibility that the movement direction is another direction, the terminal determines the straight line passing through the aiming point and extending along the horizontal direction, and the straight line may be regarded as a movement trajectory of which the aiming point moves out of the body area. Therefore, the two intersections of the straight line and the boundary line of the body area may be last points passing through the body area in a process in which the aiming point moves out of the body area, and then the distance required for the aiming point to move out of the body area of the target virtual object is a longest distance in distances between the aiming point and the two intersections. Therefore, the intersection farthest from the aiming point in the two intersections is determined as the target edge point, so that a distance between the target edge point and the aiming point is determined as the first distance required for the aiming point to move out of the body area.

Only an example in which the first distance required for the aiming point to move out of the body area is determined through the distance between the aiming point and the target edge point is used for description in this embodiment of this application. In another embodiment, the terminal may also determine the first distance required for the aiming point to move out of the body area by other methods.

Only an example in which the first distance is determined in accordance with a determination that the aiming point is located in the body area of the target virtual object is used for description in this embodiment of this application. In another embodiment, the terminal determines the first distance in accordance with a determination that the aiming point is located in the body area of the target virtual object and the target virtual object is in a moving state. If the aiming point is located in the body area of the target virtual object but the target virtual object is not in the moving state but in a static state, there is no need to determine the first distance required for the aiming point to move out of the body area and perform the following step 302 and step 303, but an attack prompt is directly performed.

302. The terminal determines a target movement speed of the target virtual object relative to the aiming point, and determines a second distance according to the target movement speed and an attack preparation duration.

The second distance is an expected movement distance of the target virtual object relative to the aiming point in the attack preparation duration. Because target virtual object in the virtual scene interface can move, and the aiming point in the virtual scene interface can also move, both the movement of the target virtual object and the movement of the aiming point may cause the aiming point to move out of the body area of the target virtual object. Therefore, to determine the expected movement distance of the target virtual object relative to the aiming point in the attack preparation duration, the target movement speed of the target virtual object relative to the aiming point needs to be first determined. In some embodiments, a product of the target movement speed and the attack preparation duration is the second distance that the target virtual object moves relative to the aiming point. The attack preparation duration is a preset duration, which can represent a duration from a time point at which the aiming point moves into the body area of the target virtual object to a time point at which the controlled virtual object performs an attack operation.

In a possible implementation, the terminal obtains a first movement speed and a first movement direction of the target virtual object in the virtual scene interface, obtains a second movement speed and a second movement direction of the aiming point in the virtual scene interface, and determines the target movement speed according to the first movement speed, the first movement direction, the second movement speed, and the second movement direction.

When both the target virtual object and the aiming point in the virtual scene interface are in the moving state, the movement speeds and the movement directions of the target virtual object and the aiming point affect a relative movement speed between the target virtual object and the aiming point. Therefore, the terminal obtains the first movement speed and the first movement direction of the target virtual object, obtains the second movement speed and the second movement direction of the aiming point, and determines the target movement speed of the target virtual object relative to the aiming point according to the first movement speed, the first movement direction, the second movement speed, and the second movement direction.

In some embodiments, the terminal determines a vector difference between the first movement speed and the second movement speed according to the first movement direction and the second movement direction, and the vector difference is the target movement speed of the target virtual object relative to the aiming point. For example, in accordance with a determination that the first movement direction and the second movement direction are the same, the terminal determines a difference between the first movement speed and the second movement speed as the target movement speed. In another example, in accordance with a determination that the first movement direction and the second movement direction are opposite, the terminal determines a sum of the first movement speed and the second movement speed as the target movement speed.

That is, the terminal determines a first vector corresponding to the target virtual object according to the first movement speed and the first movement direction, and the first vector can represent the movement speed and the movement direction of the target virtual object. The terminal determines a second vector corresponding to the aiming point according to the second movement speed and the second movement direction, and the second vector can represent the movement speed and the movement direction of the aiming point. The terminal determines a vector difference between the first vector and the second vector, and the vector difference is the target movement speed of the target virtual object relative to the aiming point.

For example, in accordance with a determination that the first movement direction and the second movement direction are the same, the target movement speed is the difference between the first movement speed and the second movement speed. In another example, in accordance with a determination that the first movement direction and the second movement direction are opposite, the target movement speed is the sum of the first movement speed and the second movement speed.

In another possible implementation, a movement speed of the target virtual object in a virtual scene interface is determined as the target movement speed in accordance with a determination that the aiming point is in a static state.

If the aiming point is in the static state, the movement speed of the target virtual object in the virtual scene interface is the movement speed of the target virtual object relative to the aiming point. Therefore, the terminal determines the movement speed of the target virtual object in the virtual scene interface as the target movement speed of the target virtual object relative to the aiming point.

In another possible implementation, the attack preparation duration can represent a duration from a time point at which the aiming point moves into the body area of the target virtual object to a time point at which the controlled virtual object performs an attack operation. The attack preparation duration includes an aiming point determining duration and an attack operation trigger duration, and the second distance includes an aiming point determining distance and an attack operation trigger distance.

The aiming point determining duration is a preset duration, which can represent a duration from the time point at which the aiming point moves into the body area of the target virtual object to a time point at which a user determines that the aiming point has been located in the body area. The aiming point determining distance is an expected movement distance of the target virtual object relative to the aiming point in the aiming point determining duration.

The attack operation trigger duration is a preset duration, which can represent a duration from the time point at which the user determines that the aiming point has been located in the body area to a time point at which the user really performs the attack operation. The attack operation trigger distance is an expected movement distance of the target virtual object relative to the aiming point in the attack operation trigger duration.

In some embodiments, the terminal prompts the user that the aiming point has been located in the body area by using the method of highlighting the aiming point, thereby reducing the aiming point determining duration. However, the attack operation trigger duration is the duration from the time point at which the user determines that the aiming point has been located in the body area to the time point at which the attack operation is really performed, namely, a neural response duration of a human body, and the duration is difficult to be reduced by the terminal. Therefore, in this embodiment of this application, the terminal sets the aiming point determining duration to be approximately 0 seconds, so that the attack preparation duration is approximated as the neural response duration of the human body, so as to set the attack preparation duration. In some embodiments, a shortest neural response duration of the human body is 0.1 seconds, and the terminal sets the attack preparation duration to 0.1 seconds.

Alternatively, the terminal sets the attack preparation duration according to another manner. This is not limited in the embodiments of this application.

By performing the above step 302, the second distance of the target virtual object is determined according to the target movement speed and the attack preparation duration. In another embodiment, the terminal may also determine the second distance by another method.

303. The terminal performs an attack prompt in accordance with a determination that the first distance is greater than the second distance.

In this embodiment of this application, in accordance with a determination that the aiming point is located in the body area of the target virtual object, the performed attack operation in this case is an operation of attacking the position where the aiming point aims at, that is, the attack operation is performed in this case, and the attack operation hits the target virtual object, so that the target virtual object is attacked. However, because there is the attack preparation duration and the target virtual object may move the second distance relative to the aiming point in the attack preparation duration, the position where the aiming point aims at has changed when the attack operation is performed, for example, the aiming point has moved out of the body area of the target virtual object. Therefore, it needs to determine whether the aiming point moves out of the body area in the attack preparation duration.

The first distance is the distance required for the aiming point to move out of the body area, and the second distance is the expected movement distance of the target virtual object relative to the aiming point in the attack preparation duration, that is, the second distance is the expected movement distance of the aiming point relative to the target virtual object in the attack preparation duration. Therefore, if the first distance is greater than the second distance, it indicates that the aiming point does not move out of the body area of the target virtual object in the attack preparation duration, that is, when the attack operation is performed, the attack operation can hit the target virtual object so that the target virtual object is attacked. Therefore, in accordance with a determination that the first distance is greater than the second distance, the terminal performs the attack prompt, to prompt the user to perform the attack operation.

If the first distance is not greater than the second distance, it indicates that the aiming point has moved out of the body area of the target virtual object in the attack preparation duration, and even though the user performs the attack operation, the attack operation does not hit the target virtual object, so that the attack operation performed by the user is invalid. Therefore, the terminal does not need to perform the attack prompt. If the user does not see the attack prompt, the attack operation is not performed, so that the misjudgment rate is reduced, and the number of invalid operations performed by the user can be reduced, thereby improving the efficiency of human-computer interaction. Moreover, in accordance with a determination that the attack operation needs to use virtual resources, the virtual resources can be prevented from being wasted, and the effect of saving the virtual resources can be achieved.

In a possible implementation, the terminal highlights the aiming point in accordance with a determination that the first distance is greater than the second distance. To make the attack operation to hit the target virtual object during battling, the user pays attention to the aiming point displayed in the virtual scene interface all the time. Therefore, by highlighting the aiming point, the user can be directly prompted to perform the attack operation, thereby improving the convenience of operation prompting.

In some embodiments, the terminal highlighting the aiming point includes at least one of the following:
(1) The terminal enlarges a size of the aiming point.
(2) The terminal increases brightness of the aiming point.
(3) The terminal switches the aiming point from static display to dynamic display. For example, the terminal performs flash display on the aiming point.
(4) The terminal displays a special effect corresponding to the aiming point. For example, the terminal displays an aperture at a boundary line of the aiming point, to prompt the user to perform the attack operation.

In some embodiments, the terminal switches the aiming point displayed in a first display mode to the aiming point displayed in a second display mode. The first display mode is normal display, and the second display mode is highlighting, so that the user is prompted to perform the attack operation by displaying the aiming point in the second display mode. For example, the first display mode is to display the aiming point with a smaller size, and the second display mode is to display the aiming point with a larger size.

Figure 6:
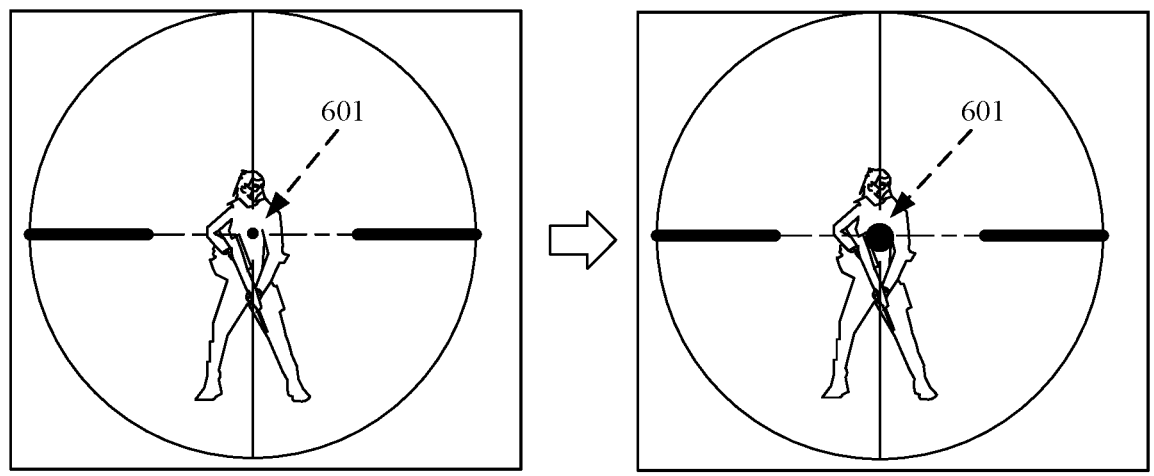
FIG. 6 is a schematic diagram of an aiming point according to an embodiment of this application.

FIG. 6 is a schematic diagram of an aiming point according to an embodiment of this application. An aiming point 601 in a virtual scene interface is located in a body area of a virtual object, and the terminal enlarges a size of the aiming point 601 in accordance with a determination that the first distance is greater than the second distance.

In another possible implementation, the terminal displays attack prompt information in accordance with a determination that the first distance is greater than the second distance. The terminal prompts the user to perform the attack operation in a manner of displaying the attack prompt information. For example, in a scene in which a virtual firearm is used to shoot the target virtual object, the terminal displays text prompt information of "please shoot". Alternatively, the terminal prompts the user to perform a shooting operation by displaying a shooting icon in the virtual scene interface.

Only an example in which the attack prompt is performed in accordance with a determination that the first distance is greater than the second distance description is used for description in this embodiment of this application. In another embodiment, the terminal performs the attack prompt in accordance with a determination that the aiming point is located in the body area of the target virtual object and the target virtual object is in a static state. Because the target virtual object is in the static state and the user does not move the aiming point in this case to aim at the target virtual object, the aiming point does not move relative to the target virtual object, that is, the aiming point does not move out of the body area of the target virtual object in the attack preparation duration. Therefore, the terminal does not need to determine the first distance and the second distance, but directly performs the attack prompt to prompt the user to perform the attack operation.

304. The terminal controls, in response to the attack operation, the controlled virtual object to attack a position where aiming point is located.

If the user determines that the aiming point has aimed at the target virtual object, the user performs an attack operation, and the terminal controls, in response to the attack operation, the controlled virtual object to attack the position where aiming point is currently located, namely, the position where the aiming point aims at.

If the user performs the attack operation in a process in which the terminal performs the attack prompt, the aiming point is still located in the body area of the target virtual object in this case, the terminal controls the controlled virtual object to attack the position where the aiming point is located, and the attack operation can hit the target virtual object so that the virtual object is attacked.

In a possible implementation, the attack operation needs to use virtual resources. Therefore, after the controlled virtual object is controlled to attack, the terminal deducts a corresponding amount of virtual resources from a virtual resource base of the controlled virtual object. For example, the virtual resources are bullets corresponding to a virtual firearm.

In a possible implementation, the attack operation is a shooting operation. Therefore, the user controls, in response to the shooting operation, the controlled virtual object to use a virtual firearm to shoot the position where aiming point is located, namely, to shoot the position where the aiming point aims at.

In some embodiments, when the controlled virtual object holds the virtual firearm, if the controlled virtual object turns on a scope configured in the virtual firearm, the terminal displays an aiming point in the scope in the virtual scene interface, and a position where the aiming point aims at is a position where the virtual firearm shoots. The virtual scene further displays a shooting button. When the user determines that the aiming point has aimed at the target virtual object, the user performs a trigger operation for the shooting button. The terminal controls, in response to the trigger operation for the shooting button, the controlled virtual object to attack the position where aiming point is located. For example, if the virtual firearm shoots a bullet, the position where the aiming point is located is a position where the bullet falls after the virtual firearm shoots the bullet. Therefore, if the aiming point is located in the body area of the target virtual object, the body area of the target virtual object is hit by the bullet.

Moreover, in a scene in which the virtual firearm is used to shoot the target virtual object, by performing the attack prompt, the misjudgment rate can be reduced, the number of invalid shooting operations performed by the user can be reduced, bullets of the virtual firearm can be prevented from being wasted, and the effect of saving the bullets can be achieved.

In another possible implementation, the attack operation is a skill casting operation. Therefore, the terminal controls, in response to the skill casting operation, the controlled virtual object to cast a skill to the position where the aiming point is located.

The skill is a long-range attack skill. For example, an effect of the skill is to reduce a health value, reduce the movement speed, or restrict movement. This is not limited in the embodiments of this application. When the user intends to cast the skill to the target virtual object to attack the target virtual object, the user performs the skill casting operation when determining that the aiming point aims at the target virtual object. The terminal controls, in response to the skill casting operation, the controlled virtual object to cast the skill to the position where the aiming point is located. If the aiming point is located in the body area of the target virtual object in this case, the casted skill hits the target virtual object.

Only an example in which step 304 is performed after step 303 is performed is used for description in this embodiment of this application. However, in another embodiment, the terminal may synchronously perform step 304 at any moment when performing step 303 and the following step 305 and step 306. Alternatively, if the user does not perform the attack operation, the terminal does not need to perform step 304.

305. The terminal determines a third distance of the target virtual object.

When the aiming point moves into the body area of the target virtual object, the terminal determines the third distance of the target virtual object in real time. The third distance is an expected movement distance of the target virtual object in a time period in which the aiming point is located in the body area, namely, a distance that the target virtual object has moved in a duration from a time point at which the aiming point is located in the body area of the target virtual object to a current time point.

In a possible implementation, the terminal obtains a first position where the target virtual object is located when the aiming point is first located in the body area, obtains a second position where the target virtual object is currently located, and determines the third distance between the first position and the second position. The third distance between the first position and the second position is the expected movement distance of the target virtual object in the time period in which the aiming point is located in the body area.

306. The terminal cancels the attack prompt in accordance with a determination that the third distance is greater than a difference between the first distance and the second distance.

The third distance of the target virtual object is the movement distance of the target virtual object in the time period in which the aiming point is located in the body area, Therefore, the third distance is an actual movement distance of the aiming point in the time period in which the aiming point is located in the body area. The terminal determines the difference between the first distance and the second distance. If the third distance is greater than the difference between the first distance and the second distance, it indicates that the distance required for the aiming point to currently move out of the target virtual object is not greater than the second distance of the target virtual object, and the target virtual object cannot be hit if the attack operation is performed in this case. Therefore, the terminal cancels the attack prompt, and does not prompt the user to perform the attack operation.

That is, because the third distance is greater than the difference between the first distance and the second distance, that is, a sum of the third distance and the second distance is greater than the first distance, the aiming point moves out of the body area of the target virtual object in the attack preparation duration, and the attack operation cannot hit the target virtual object when being performed. Therefore, the attack prompt is canceled.

In a possible implementation, the terminal cancels the highlight of the aiming point in accordance with a determination that the third distance is greater than the difference between the first distance and the second distance.

In some embodiments, the terminal canceling the highlight of the aiming point includes at least one of the following:

(1) The terminal reduces a size of the aiming point.
(2) The terminal decreases brightness of the aiming point.
(3) The terminal switches the aiming point from dynamic display to static display.
(4) The terminal cancels display of a special effect corresponding to the aiming point.

In some embodiments, the terminal switches the aiming point displayed in a second display mode to the aiming point displayed in a first display mode. The first display mode is normal display, and the second display mode is highlighting.

For example, the first display mode is to display the aiming point with a smaller size, and the second display mode is to display the aiming point with a larger size.

In another possible implementation, the terminal cancels the display of the attack prompt information in accordance with a determination that the third distance is greater than the difference between the first distance and the second distance, so as to cancel the attack prompt.

Only an example in which the third distance is greater than the difference between the first distance and the second distance is used for description in this embodiment of this application. Correspondingly, in another embodiment, if the third distance is not greater than the difference between the first distance and the second distance, it indicates that the distance required for the aiming point to currently move out of the body area of the target virtual object is still greater than the second distance of the target virtual object, and the terminal continues to perform the attack prompt.

Only an example in which the attack prompt is canceled in accordance with a determination that the third distance is greater than the difference between the first distance and the second distance is used for description in this embodiment of this application. However, in another embodiment, the terminal does not need to determine the third distance of the target virtual object in real time, but determines the first distance required for the aiming point to currently move out of the body area of the target virtual object in real time, and cancels the attack prompt in accordance with a determination that the redetermined first distance is not greater than the second distance or continues to perform the attack prompt in accordance with a determination that the redetermined first distance is still greater than the second distance.

In the related art, there is a delay between aiming at a virtual object B and performing a shooting operation, and the virtual object B may move after the virtual object B is aimed at, so that an aiming point has not been in a body area of the virtual object B when the shooting operation is performed, and then the virtual object B is not hit, resulting in a lower hit rate of the shooting operation.

In the method provided in the embodiments of this application, if a distance required for an aiming point to move out of a body area of a virtual object is greater than a distance of the virtual object relative to the aiming point in an attack preparation duration, it indicates that the aiming point does not move out of the body area in the attack preparation duration, and a user can hit the virtual object when performing an attack operation. Therefore, an attack prompt is performed, to prompt the user to perform the attack operation, so that the user can better grasp the timing of the attack, and the hit rate of the attack operation is improved.

Moreover, because the misjudgment rate can be reduced and the number of invalid shooting operations performed by the user can be reduced by performing the attack prompt, the efficiency of human-computer interaction can be improved. Moreover, in accordance with a determination that the attack operation needs to use virtual resources, the virtual resources can be prevented from being wasted, and the effect of saving the virtual resources can be achieved.

Moreover, to make the attack operation to hit the target virtual object during battling, the user pays attention to the aiming point displayed in the virtual scene interface all the time. Therefore, by highlighting the aiming point, the user can be directly and clearly prompted to perform the attack operation, thereby improving the effectiveness of operation prompting.

Figure 7:
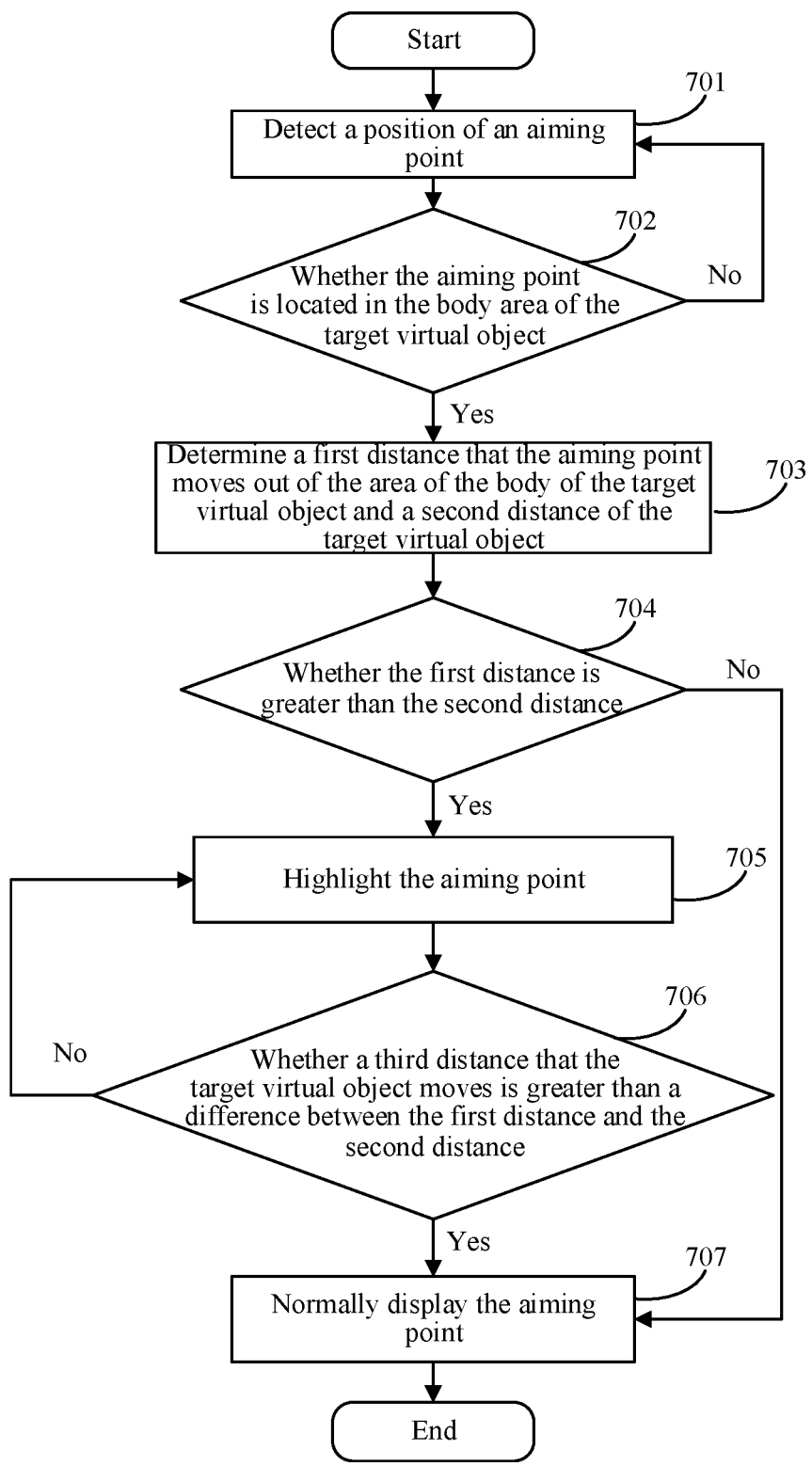
FIG. 7 is a flowchart of an operation prompting method according to an embodiment of this application.

FIG. 7 is a flowchart of an operation prompting method according to an embodiment of this application. Referring to FIG. 7, the method includes the following steps:

701. A terminal detects a position of an aiming point.

702. The terminal determines whether the aiming point is located in a body area of a target virtual object; performs step 702 if the aiming point is located in the body area of the target virtual object; and continues to perform step 701 if the aiming point is not located in the body area of the target virtual object.

703. The terminal determines a first distance that the aiming point moves out of the body area and a second distance that the target virtual object can move relative to the aiming point in an attack preparation duration.

704. The terminal determines whether the first distance is greater than the second distance; performs step 705 if the first distance is greater than the second distance; and performs step 707 if the first distance is not greater than the second distance.

705. The terminal highlights the aiming point.

706. The terminal determines whether a third distance that the target virtual object moves is greater than a difference between the first distance and the second distance; performs step 707 if the third distance is greater than the difference between the first distance and the second distance; and performs step 705 if the third distance is not greater than the difference between the first distance and the second distance.

707. The terminal performs normal display on the aiming point, where the normal display means that the terminal does not highlight the aiming point.

Figure 8:
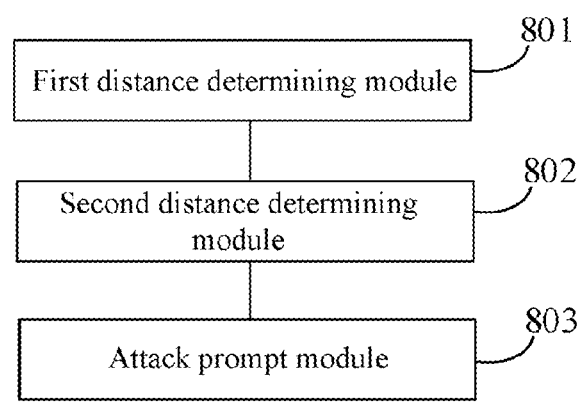
FIG. 8 is a schematic structural diagram of an operation prompting apparatus according to an embodiment of this application.

FIG. 8 is a schematic structural diagram of an operation prompting apparatus according to an embodiment of this application. Referring to FIG. 8, the apparatus includes:

a first distance determining module 801, configured to determine, in accordance with a determination that an aiming point is located in a body area of a target virtual object, a first distance required for the aiming point to move out of the body area;

a second distance determining module 802, configured to determine a second distance, the second distance being an expected movement distance of the target virtual object relative to the aiming point in an attack preparation duration; and an attack prompt module 803, configured to perform an attack prompt in accordance with a determination that the first distance is greater than the second distance.

Figure 9:
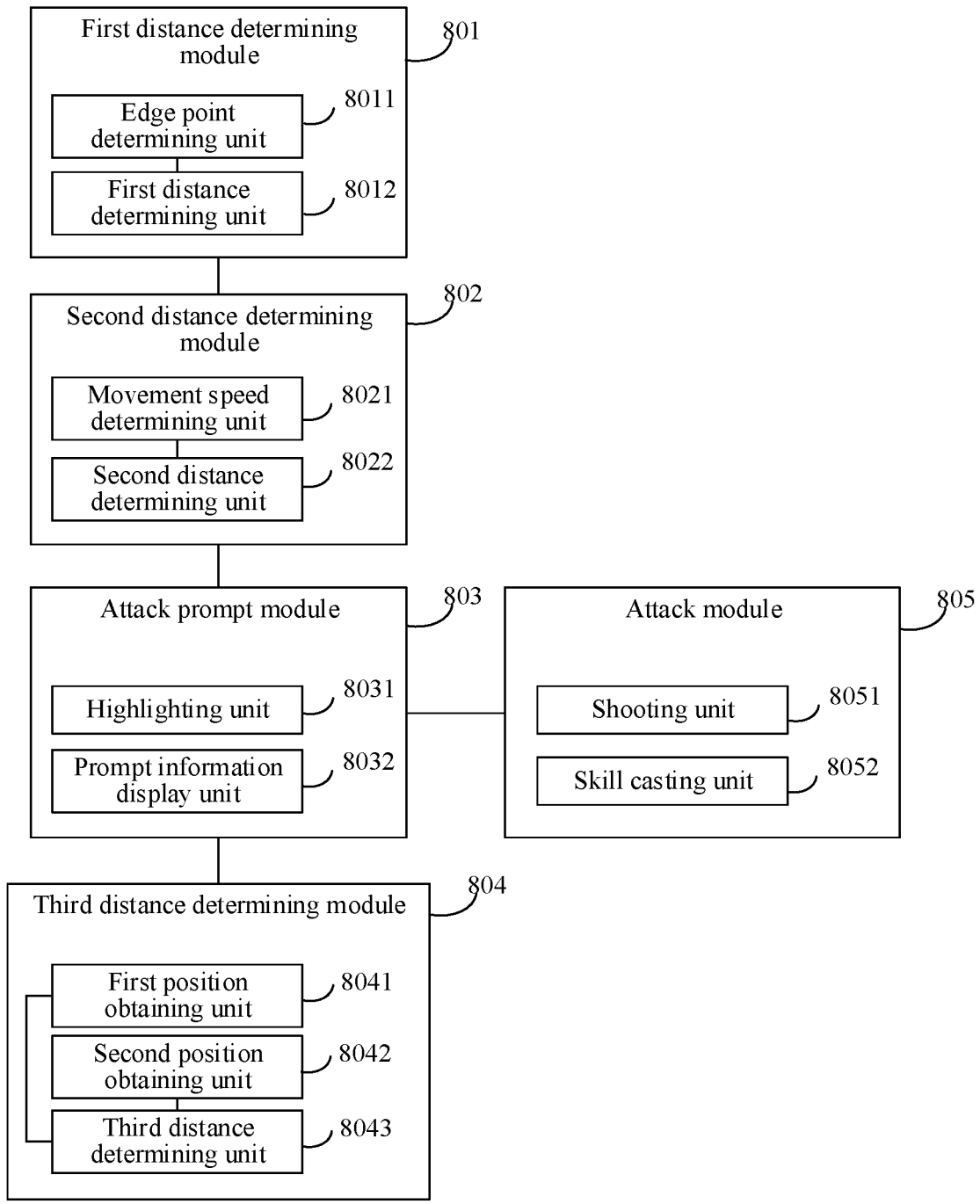
FIG. 9 is a schematic structural diagram of another operation prompting apparatus according to an embodiment of this application.

In some embodiments, referring to FIG. 9, the attack prompt module 803 includes:

a highlighting unit 8031, configured to highlight the aiming point in accordance with a determination that the first distance is greater than the second distance.

In some embodiments, referring to FIG. 9, the highlighting unit 8031 is configured to perform at least one of the following:

enlarging a size of the aiming point;
increasing brightness of the aiming point;
switching the aiming point from static display to dynamic display; or
displaying a special effect corresponding to the aiming point.

In some embodiments, referring to FIG. 9, the attack prompt module 803 includes:

a prompt information display unit 8032, configured to display attack prompt information in accordance with a determination that the first distance is greater than the second distance.

In some embodiments, referring to FIG. 9, the first distance determining module 801 includes:

an edge point determining unit 8011, configured to determine a target edge point of the body area in accordance with a determination that the aiming point is located in the body area of the target virtual object; and a first distance determining unit 8012, configured to determine the first distance between the aiming point and the target edge point.

In some embodiments, referring to FIG. 9, the edge point determining unit 8011 is configured to:

determine a movement direction of the aiming point relative to the target virtual object; and determine a ray having the aiming point as a starting point and extending along the movement direction, and determine an intersection of the ray and a boundary line of the body area as the target edge point.

In some embodiments, referring to FIG. 9, the edge point determining unit 8011 is configured to:

determine an edge point farthest from the aiming point in the body area as the target edge point.

In some embodiments, referring to FIG. 9, the edge point determining unit 8011 is configured to:

determine a straight line passing through the aiming point and extending along a horizontal direction, and determine two intersections of the straight line and a boundary line of the body area; and determine an intersection farthest from the aiming point in the two intersections as the target edge point.

In some embodiments, referring to FIG. 9, the second distance determining module 802 includes:

a movement speed determining unit 8021, configured to determine a target movement speed of the target virtual object relative to the aiming point; and a second distance determining unit 8022, configured to determine the second distance according to the target movement speed and the attack preparation duration.

In some embodiments, referring to FIG. 9, the movement speed determining unit 8021 is configured to:

obtain a first movement speed and a first movement direction of the target virtual object in a virtual scene interface;

obtain a second movement speed and a second movement direction of the aiming point in the virtual scene interface; and determine the target movement speed according to the first movement speed, the first movement direction, the second movement speed, and the second movement direction.

In some embodiments, referring to FIG. 9, the movement speed determining unit 8021 is configured to:

determine a movement speed of the target virtual object in a virtual scene interface as the target movement speed in accordance with a determination that the aiming point is in a static state.

In some embodiments, referring to FIG. 9, the apparatus further includes:

a third distance determining module 804, configured to determine a third distance, the third distance being a movement distance of the target virtual object in a time period in which the aiming point is located in the body area; and the attack prompt module 803 is further configured to cancel the attack prompt in accordance with a determination that the third distance is greater than a difference between the first distance and the second distance.

In some embodiments, referring to FIG. 9, the third distance determining module 804 includes:

a first position obtaining unit 8041, configured to obtain a first position where the target virtual object is located in accordance with a determination that the aiming point moves into the body area;

a second position obtaining unit 8042, configured to obtain a second position where the target virtual object is currently located; and a third distance determining unit 8043, configured to determine the third distance located between the first position and the second position.

In some embodiments, referring to FIG. 9, the first distance determining unit 8012 is configured to:

determine the first distance in accordance with a determination that the aiming point is located in the body area of the target virtual object and the target virtual object is in a moving state.

In some embodiments, referring to FIG. 9, the attack prompt module 803 is further configured to:

perform the attack prompt in accordance with a determination that the aiming point is located in the body area of the target virtual object and the target virtual object is in a static state.

In some embodiments, referring to FIG. 9, the apparatus further includes:

an attack module 805, configured to control, in response to an attack operation, a controlled virtual object to attack a position where the aiming point is located.

In some embodiments, referring to FIG. 9, the attack module 805 includes:

a shooting unit 8051, configured to control, in response to a shooting operation, the controlled virtual object to use a virtual firearm to shoot the position where the aiming point is located; or a skill casting unit 8052, configured to control, in response to a skill casting operation, the controlled virtual object to cast a skill to the position where the aiming point is located.

When the operation prompting apparatus provided in the foregoing embodiment prompts an execution operation, only divisions of the foregoing functional modules are described by using an example. During actual application, the foregoing functions may be allocated to and completed by different functional modules according to requirements, that is, an internal structure of a terminal is divided into different functional modules, to complete all or some of the foregoing described functions. In addition, the operation prompting apparatus and operation prompting method embodiments provided in the above embodiments belong to the same concept. For the specific implementation process, reference may be made to the method embodiments, and details are not described herein again.

According to the operation prompting apparatus provided in the embodiments of this application, if a distance required for an aiming point to move out of a body area of a virtual object is greater than a distance of the virtual object relative to the aiming point in an attack preparation duration, it indicates that the aiming point does not move out of the body area in the attack preparation duration, and a user can hit the virtual object when performing an attack operation. Therefore, an attack prompt is performed, to prompt the user to perform the attack operation, so that the user can better grasp the timing of the attack, and the hit rate of the attack operation is improved.

Figure 10:
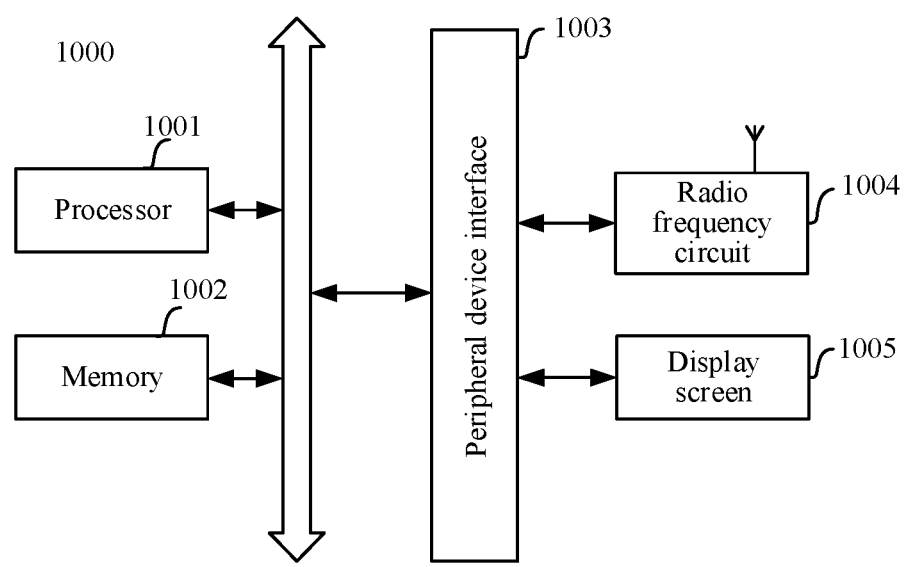
FIG. 10 is a schematic structural diagram of a terminal according to an embodiment of this application.

FIG. 10 is a schematic structural diagram of a terminal 1000 according to an embodiment of this application. The terminal 1000 may be configured to perform steps performed by the terminal in the foregoing operation prompting method.

The terminal 1000 includes a processor 1001 and a memory 1002.

The processor 1001 may include one or more processing cores, such as a 4-core processor or an 8-core processor. The processor 1001 may be implemented by using at least one hardware form of a digital signal processor (DSP), a field-programmable gate array (FPGA), and a programmable logic array (PLA).

The memory 1002 may include one or more computer-readable storage media. The computer-readable storage media may be non-transitory. The memory 1002 may also include a high-speed random access memory, as well as non-volatile memory, such as one or more disk storage devices and flash storage devices. In some embodiments, a non-transitory computer-readable storage medium in the memory 1002 is configured to store at least one program code, the at least one program code being configured to be included by the processor 1001 to implement the operation prompting method provided in the method embodiments of this application.

In some embodiments, the terminal 1000 may include a peripheral device interface 1003 and at least one peripheral device. The processor 1001, the memory 1002, and the peripheral device interface 1003 may be connected by using a bus or a signal cable. Each peripheral device may be connected to the peripheral device interface 1003 by using a bus, a signal line, or a circuit board. In some embodiments, the peripheral device includes: at least one of a radio frequency (RF) circuit 1004 and a display screen 1005.

The peripheral device interface 1003 may be configured to connect at least one peripheral device related to input/output (I/O) to the processor 1001 and the memory 1002. In some embodiments, the processor 1001, the memory 1002, and the peripheral device interface 1003 are integrated on the same chip or the same circuit board. In some other embodiments, any or both of the processor 1001, the memory 1002, and the peripheral device interface 1003 may be implemented on an independent chip or circuit board, which is not limited in this embodiment.

The RF circuit 1004 is configured to receive and transmit an RF signal, which is also referred to as an electromagnetic signal. The RF circuit 1004 communicates with a communication network and another communication device by using the electromagnetic signal. The RF circuit 1004 converts an electric signal into an electromagnetic signal for transmission, or converts a received electromagnetic signal into an electric signal. In some embodiments, the RF circuit 1004 includes: an antenna system, an RF transceiver, one or more amplifiers, a tuner, an oscillator, a digital signal processor, a codec chip set, a subscriber identity module card, and the like. The RF circuit 1004 may communicate with other devices through at least one wireless communication protocol. The wireless communication protocol includes, but is not limited to, a metropolitan area network, different generations of mobile communication networks (2G, 3G, 4G, and 5G), a wireless local area network, and/or a wireless fidelity (Wi-Fi) network. In some embodiments, the RF circuit 1004 may further include a circuit related to near field communication (NFC), which is not limited in this application.

The display screen 1005 is configured to display a user interface (UI). The UI may include a graph, a text, an icon, a video, and any combination thereof. When the display screen 1005 is a touch display screen, the display screen 1005 also has the ability to collect a touch signal at or above the surface of the display screen 1005. The touch signal may be inputted, as a control signal, to the processor 1001 for processing. In this case, the display screen 1005 may also be configured to provide virtual buttons and/or virtual keyboards, also referred to as soft buttons and/or soft keyboards. In some embodiments, there may be one display screen 1005, arranged on a front panel of the terminal 1000. In some other embodiments, there may be two display screens 1005 respectively arranged on different surfaces of the terminal 1000 or in a folded design. In some other embodiments, the display screen 1005 may be a flexible display screen arranged on a curved or folded surface of the terminal 1000. Even further, the display screen 1005 may be arranged in a non-rectangular irregular pattern, that is, a special-shaped screen. The display screen 1005 may be prepared by using materials such as a liquid crystal display (LCD), an organic light-emitting diode (OLED), or the like.

A person skilled in the art may understand that the structure shown in FIG. 10 does not constitute a limitation to the terminal 1000, and the terminal may include more components or fewer components than those shown in the figure, or some components may be combined, or a different component deployment may be used.

An embodiment of this application further provides a terminal. The terminal includes: a processor and a memory, the memory storing at least one piece of program code, the at least one piece of program code being loaded and executed by the processor to implement the following operations:

determining, in accordance with a determination that an aiming point is located in a body area of a target virtual object, a first distance required for the aiming point to move out of the body area;

determining a second distance, the second distance being a movement distance of the target virtual object relative to the aiming point in an attack preparation duration; and performing an attack prompt in accordance with a determination that the first distance is greater than the second distance.

In some embodiments, the at least one piece of program code is further loaded and executed by the processor to implement the following operation:

highlighting the aiming point in accordance with a determination that the first distance is greater than the second distance.

In some embodiments, the at least one piece of program code is further loaded and executed by the processor to implement at least one of the following operations:

enlarging a size of the aiming point; increasing brightness of the aiming point; switching the aiming point from static display to dynamic display; or displaying a special effect corresponding to the aiming point.

In some embodiments, the at least one piece of program code is further loaded and executed by the processor to implement the following operation:

displaying attack prompt information in accordance with a determination that the first distance is greater than the second distance.

In some embodiments, the at least one piece of program code is further loaded and executed by the processor to implement the following operations:

determining a target edge point of the body area in accordance with a determination that the aiming point is located in the body area of the target virtual object; and determining the first distance between the aiming point and the target edge point.

In some embodiments, the at least one piece of program code is further loaded and executed by the processor to implement the following operations:

determining a movement direction of the aiming point relative to the target virtual object; and determining a ray having the aiming point as a starting point and extending along the movement direction, and determining an intersection of the ray and a boundary line of the body area as the target edge point.

In some embodiments, the at least one piece of program code is further loaded and executed by the processor to implement the following operation:

determining an edge point farthest from the aiming point in the body area as the target edge point.

In some embodiments, the at least one piece of program code is further loaded and executed by the processor to implement the following operations:

determining a straight line passing through the aiming point and extending along a horizontal direction, and determining two intersections of the straight line and a boundary line of the body area; and determining an intersection farthest from the aiming point in the two intersections as the target edge point.

In some embodiments, the at least one piece of program code is further loaded and executed by the processor to implement the following operations:

determining a target movement speed of the target virtual object relative to the aiming point; and determining the second distance according to the target movement speed and the attack preparation duration.

In some embodiments, the at least one piece of program code is further loaded and executed by the processor to implement the following operations:

obtaining a first movement speed and a first movement direction of the target virtual object in a virtual scene interface;

obtaining a second movement speed and a second movement direction of the aiming point in the virtual scene interface; and determining the target movement speed according to the first movement speed, the first movement direction, the second movement speed, and the second movement direction.

In some embodiments, the at least one piece of program code is further loaded and executed by the processor to implement the following operation:

determining a movement speed of the target virtual object in a virtual scene interface as the target movement speed in accordance with a determination that the aiming point is in a static state.

In some embodiments, the at least one piece of program code is further loaded and executed by the processor to implement the following operations:

determining a third distance, the third distance being a movement distance of the target virtual object in a time period in which the aiming point is located in the body area; and canceling the attack prompt in accordance with a determination that the third distance is greater than a difference between the first distance and the second distance.

In some embodiments, the at least one piece of program code is further loaded and executed by the processor to implement the following operations:

obtaining a first position where the target virtual object is located in accordance with a determination that the aiming point moves into the area of the body of the target virtual object;

obtaining a second position where the target virtual object is currently located; and determining the third distance between the first position and the second position.

In some embodiments, the at least one piece of program code is further loaded and executed by the processor to implement the following operation:

determining the first distance in accordance with a determination that the aiming point is located in the body area of the target virtual object and the target virtual object is in a moving state.

In some embodiments, the at least one piece of program code is further loaded and executed by the processor to implement the following operation:

performing the attack prompt in accordance with a determination that the aiming point is located in the body area of the target virtual object and the target virtual object is in a static state.

In some embodiments, the at least one piece of program code is further loaded and executed by the processor to implement the following operation:

controlling, in response to an attack operation, a controlled virtual object to attack a position where the aiming point is located.

In some embodiments, the at least one piece of program code is further loaded and executed by the processor to implement the following operations:

controlling, in response to a shooting operation, the controlled virtual object to use a virtual firearm to shoot the position where the aiming point is located; or controlling, in response to a skill casting operation, the controlled virtual object to cast a skill to the position where the aiming point is located.

An embodiment of this application further provides a computer-readable storage medium. The computer-readable storage medium stores at least one program code, the program code being loaded and executed by a processor to implement the following operations:

determining, in accordance with a determination that an aiming point is located in a body area of a target virtual object, a first distance required for the aiming point to move out of the body area;

determining a second distance, the second distance being a movement distance of the target virtual object relative to the aiming point in an attack preparation duration; and performing an attack prompt in accordance with a determination that the first distance is greater than the second distance.

In some embodiments, the at least one piece of program code is further loaded and executed by the processor to implement the following operation:

highlighting the aiming point in accordance with a determination that the first distance is greater than the second distance.

In some embodiments, the at least one piece of program code is further loaded and executed by the processor to implement at least one of the following operations:

enlarging a size of the aiming point; increasing brightness of the aiming point; switching the aiming point from static display to dynamic display; or displaying a special effect corresponding to the aiming point.

In some embodiments, the at least one piece of program code is further loaded and executed by the processor to implement the following operation:

displaying attack prompt information in accordance with a determination that the first distance is greater than the second distance.

In some embodiments, the at least one piece of program code is further loaded and executed by the processor to implement the following operations:

determining a target edge point of the body area in accordance with a determination that the aiming point is located in the body area of the target virtual object; and determining the first distance between the aiming point and the target edge point.

In some embodiments, the at least one piece of program code is further loaded and executed by the processor to implement the following operations:

determining a movement direction of the aiming point relative to the target virtual object; and determining a ray having the aiming point as a starting point and extending along the movement direction, and determining an intersection of the ray and a boundary line of the body area as the target edge point.

In some embodiments, the at least one piece of program code is further loaded and executed by the processor to implement the following operation:

determining an edge point farthest from the aiming point in the body area as the target edge point.

In some embodiments, the at least one piece of program code is further loaded and executed by the processor to implement the following operations:

determining a straight line passing through the aiming point and extending along a horizontal direction, and determining two intersections of the straight line and a boundary line of the body area; and determining an intersection farthest from the aiming point in the two intersections as the target edge point.

In some embodiments, the at least one piece of program code is further loaded and executed by the processor to implement the following operations:

determining a target movement speed of the target virtual object relative to the aiming point; and determining the second distance according to the target movement speed and the attack preparation duration.

In some embodiments, the at least one piece of program code is further loaded and executed by the processor to implement the following operations:

obtaining a first movement speed and a first movement direction of the target virtual object in a virtual scene interface;

obtaining a second movement speed and a second movement direction of the aiming point in the virtual scene interface; and determining the target movement speed according to the first movement speed, the first movement direction, the second movement speed, and the second movement direction.

In some embodiments, the at least one piece of program code is further loaded and executed by the processor to implement the following operation:

determining a movement speed of the target virtual object in a virtual scene interface as the target movement speed in accordance with a determination that the aiming point is in a static state.

In some embodiments, the at least one piece of program code is further loaded and executed by the processor to implement the following operations:

determining a third distance, the third distance being a movement distance of the target virtual object in a time period in which the aiming point is located in the body area; and canceling the attack prompt in accordance with a determination that the third distance is greater than a difference between the first distance and the second distance.

In some embodiments, the at least one piece of program code is further loaded and executed by the processor to implement the following operations:

obtaining a first position where the target virtual object is located in accordance with a determination that the aiming point moves into the area of the body of the target virtual object;

obtaining a second position where the target virtual object is currently located; and determining the third distance between the first position and the second position.

In some embodiments, the at least one piece of program code is further loaded and executed by the processor to implement the following operation:

determining the first distance in accordance with a determination that the aiming point is located in the body area of the target virtual object and the target virtual object is in a moving state.

In some embodiments, the at least one piece of program code is further loaded and executed by the processor to implement the following operation:

performing the attack prompt in accordance with a determination that the aiming point is located in the body area of the target virtual object and the target virtual object is in a static state.

In some embodiments, the at least one piece of program code is further loaded and executed by the processor to implement the following operation:

controlling, in response to an attack operation, a controlled virtual object to attack a position where the aiming point is located.

In some embodiments, the at least one piece of program code is further loaded and executed by the processor to implement the following operations:

controlling, in response to a shooting operation, the controlled virtual object to use a virtual firearm to shoot the position where the aiming point is located; or controlling, in response to a skill casting operation, the controlled virtual object to cast a skill to the position where the aiming point is located.

An embodiment of this application further provides a computer program product or a computer program. The computer program product or the computer program includes computer program code, the computer program code being stored in a computer-readable storage medium, a processor of a terminal reading the computer program code from the computer-readable storage medium, and the processor executing the computer program code to cause the terminal to implement the operations performed in the operation prompting method according to the above embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

The foregoing descriptions are merely embodiments of this application, but are not intended to be limiting. Any modification, equivalent replacement, or improvement made without departing from the spirit and principle of the embodiments of this application is to fall within the protection scope of this application.

What is claimed is:

1. An operation prompting method, performed by a terminal, the method comprising:

in accordance with a determination that an aiming point is located in an area of a body of a target virtual object, determining a first distance for moving the aiming point out of the area of the body of the target virtual object;

determining a second distance, wherein the second distance is an expected movement distance of the target virtual object relative to the aiming point within an attack preparation duration; and in accordance with a determination that the first distance is greater than the second distance:

performing an attack prompt.

2. The method according to claim 1, wherein performing the attack prompt comprises:

highlighting the aiming point in accordance with the determination that the first distance is greater than the second distance.

3. The method according to claim 2, wherein highlighting the aiming point comprises at least one of the following:

enlarging a size of the aiming point;

increasing a brightness of the aiming point;

switching the aiming point from a static display to a dynamic display; or displaying a special effect corresponding to the aiming point.

4. The method according to claim 1, wherein performing an attack prompt comprises:

in accordance with the determination that the first distance is greater than the second distance:

displaying attack prompt information.

5. The method according to claim 1, wherein determining the first distance for moving the aiming point out of the area of the body of the target virtual object comprises:

in accordance with a determination that the aiming point is located in the area of the body of the target virtual object:

determining a target edge point of the area of the body of the target virtual object; and determining the first distance between the aiming point and the target edge point.

6. The method according to claim 5, wherein determining the target edge point comprises:

determining a movement direction of the aiming point relative to the target virtual object; and determining a ray having the aiming point as a starting point and extending along the movement direction; and determining an intersection of the ray and a boundary line of the area of the body of the target virtual object as the target edge point.

7. The method according to claim 5, wherein determining the target edge point comprises:

determining an edge point farthest from the aiming point in the area of the body of the target virtual object as the target edge point.

8. The method according to claim 5, wherein determining the target edge point comprises:

determining a straight line passing through the aiming point and extending along a horizontal direction, and determining two intersections of the straight line and a boundary line of the area of the body of the target virtual object; and determining an intersection farthest from the aiming point in the two intersections as the target edge point.

9. The method according to claim 1, wherein determining the second distance comprises:

determining a target movement speed of the target virtual object relative to the aiming point; and determining the second distance according to the target movement speed and the attack preparation duration.

10. The method according to claim 9, wherein determining the target movement speed of the target virtual object relative to the aiming point comprises:

obtaining a first movement speed and a first movement direction of the target virtual object in a virtual scene interface;

obtaining a second movement speed and a second movement direction of the aiming point in the virtual scene interface; and determining the target movement speed according to the first movement speed, the first movement direction, the second movement speed, and the second movement direction.

11. The method according to claim 9, wherein determining a target movement speed of the target virtual object relative to the aiming point comprises:

in accordance with a determination that the aiming point is in a static state:

determining a movement speed of the target virtual object in a virtual scene interface as the target movement speed.

12. The method according to claim 1, further comprising:

determining a third distance, the third distance being a movement distance of the target virtual object within a time period in which the aiming point is located in the area of the body of the target virtual object; and in accordance with a determination that the third distance is greater than a difference between the first distance and the second distance: canceling the attack prompt.

13. The method according to claim 12, wherein determining the third distance comprises:

in accordance with a determination that the aiming point moves into the area of the body of the target virtual object:

obtaining a first position where the target virtual object is located;

obtaining a second position where the target virtual object is currently located; and determining the third distance between the first position and the second position.

14. The method according to claim 1, wherein determining the first distance for moving the aiming point out of the area of the body of the target virtual object comprises:

in accordance with a determination that the aiming point is located in the area of the body of the target virtual object and the target virtual object is in a moving state: determining the first distance.

15. The method according to claim 1, further comprising:

in accordance with a determination that the aiming point is located in the body area of the target virtual object and the target virtual object is in a static state: performing the attack prompt.

16. The method according to claim 1, further comprising:

controlling, in response to an attack operation, a controlled virtual object to attack a position where the aiming point is located.

17. The method according to claim 16, wherein controlling the controlled virtual object comprises:

controlling, in response to a shooting operation, the controlled virtual object to shoot, using a virtual firearm, at the position where the aiming point is located; or controlling, in response to a skill casting operation, the controlled virtual object to cast a skill at the position where the aiming point is located.

18. An electronic device, comprising:

one or more processors; and memory storing one or more programs, the one or more programs comprising instructions that, when executed by the one or more processors, cause the one or more processors to perform operations comprising:

in accordance with a determination that an aiming point is located in an area of a body of a target virtual object: determining a first distance for moving the aiming point out of the area of the body of the target virtual object;

determining a second distance, wherein the second distance is an expected movement distance of the target virtual object relative to the aiming point within an attack preparation duration; and in accordance with a determination that the first distance is greater than the second distance:

performing an attack prompt.

19. The electronic device according to claim 18, wherein determining the second distance comprises:

determining a target movement speed of the target virtual object relative to the aiming point; and determining the second distance according to the target movement speed and the attack preparation duration.

20. A non-transitory computer-readable storage medium, storing a computer program, the computer program, when executed by one or more processors of an electronic device, cause the one or more processors to perform operations comprising:

in accordance with a determination that an aiming point is located in an area of a body of a target virtual object: determining a first distance for moving the aiming point out of the area of the body of the target virtual object;

determining a second distance, wherein the second distance is an expected movement distance of the target virtual object relative to the aiming point within an attack preparation duration; and in accordance with a determination that the first distance is greater than the second distance:

performing an attack prompt.

* * * * *